US012682354B2

(12) United States Patent
Butvinik et al.

(10) Patent No.: US 12,682,354 B2
(45) Date of Patent: Jul. 14, 2026

(54) AUTONOMOUS RISK INVESTIGATIONS USING AN INTELLIGENT DECISION AUTOMATION FRAMEWORK FOR INVESTIGATION DATA DECISIONING

(71) Applicant: ACTIMIZE LTD., Ra'anana (IL)

(72) Inventors: Danny Butvinik, Haifa (IL); Efim Dimenstein, Kadima (IL); Yossi Levin, Ein Vered (IL)

(73) Assignee: ACTIMIZE LTD., Ra'anana, IL (US)

( * ) Notice: Subject to any disclaimer, the term of this patent is extended or adjusted under 35 U.S.C. 154(b) by 130 days.

(21) Appl. No.: 18/543,128

(22) Filed: Dec. 18, 2023

(65) Prior Publication Data

US 2025/0200578 A1     Jun. 19, 2025

(51) Int. Cl.
*G06Q 20/40*        (2012.01)
*G06Q 30/018*       (2023.01)

(52) U.S. Cl.
CPC ....... *G06Q 20/4016* (2013.01); *G06Q 30/018* (2013.01)

(58) Field of Classification Search
CPC .......................... G06Q 20/4016; G06Q 30/018
See application file for complete search history.

(56) References Cited

U.S. PATENT DOCUMENTS

| | | | | |
|---|---|---|---|---|
| 11,423,418 | B1 * | 8/2022 | Merritt | G06Q 30/0185 |
| 12,068,073 | B1 * | 8/2024 | Zoldan | G06Q 10/1053 |
| 2010/0088245 | A1 * | 4/2010 | Harrison | G06Q 10/10 705/317 |
| 2012/0101926 | A1 * | 4/2012 | Leibon | G06Q 40/00 705/35 |
| 2016/0104163 | A1 * | 4/2016 | Aquino | G06Q 20/4016 705/44 |
| 2023/0385439 | A1 * | 11/2023 | Silva | G06F 16/2445 |
| 2024/0015161 | A1 * | 1/2024 | Loose, Jr. | H04L 63/104 |
| 2024/0054570 | A1 * | 2/2024 | Juban | G06Q 20/401 |

* cited by examiner

*Primary Examiner* — Scott S Trotter

(57) ABSTRACT

An autonomous risk investigation system and methods are provided that are configured to automate investigation tasks during a plurality of investigation stages using an intelligent decision automation framework. The system includes a processor and a computer readable medium operably coupled thereto, the computer readable medium comprising a plurality of instructions stored in association therewith that are accessible to, and executable by, the processor, to perform investigation recommendation operations which include receiving a task for a risk investigation of a fraud alert for an entity, determining a prioritization of the fraud alert, allocating the task for the fraud alert to an investigator, determining investigation data for the task, collecting the investigation data from at least one data resource, orchestrating the investigation data with at least one additional task, and outputting the investigation data for the risk investigation in compliance with data security requirements and the required legal standards and regulations.

20 Claims, 7 Drawing Sheets

AUTONOMOUS RISK INVESTIGATIONS USING AN INTELLIGENT DECISION AUTOMATION FRAMEWORK FOR INVESTIGATION DATA DECISIONING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to artificial intelligence (AI) and machine learning (ML) systems and models, such as those that may be used for anti-money laundering (AML) and fraud detection with financial institutions, and more specifically to a system and method for programmatically evaluating and automating investigation tasks during different stages of fraud investigations.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

Financial crimes including money laundering and fraud threaten the financial industry by undermining trust, integrity, and stability that users have in their financial institutions. As such, financial crimes, such as money laundering, fraud, and other illicit activities, present formidable challenges to these financial institutions. Financial institutions have responded by implementing various risk management and investigation techniques to mitigate these risks. However, the ever-evolving landscape of financial crimes presents an ongoing and formidable challenge when identifying and investigation financial crimes. For example, traditional fraud and risk alert investigation processes and procedures rely heavily on manual processes and efforts by investigators, and therefore, struggle to keep pace with the increasingly sophisticated techniques that criminals employ. Further, investigators face overwhelming data volumes, intricate patterns, and the urgency of timely decision-making.

Thus, investigators face challenges in analyzing vast volumes of data, detecting subtle patterns, and making timely decisions. Since manual processes and conventional fraud investigation, which are time-consuming and resource-intensive in nature, are prone to errors, these manual processes result in inefficiencies, delays, and missed opportunities to identify and mitigate risks. Moreover, the exponential growth in the volume and complexity of financial transactions further exacerbates the need for a more sophisticated and technologically advanced approaches to fraud and risk alert investigations.

A solution to these technical problems in fraud investigations is required to address limitations with conventional fraud detection systems while streamlining investigative workflows, providing accurate and timely insights, and maintaining data security. Thus, it is desirable to automate labor-intensive processes, reduce investigator time, and enhance financial crime detection and investigation efficiency. Therefore, there is a need for an automated, intelligent, and efficient computing system and framework that can assist and augment investigator capabilities, automate repetitive tasks, and provide actionable insights while enhancing efficiency and reducing operational costs and computing resource usage.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

DETAILED DESCRIPTION

Figure 1:
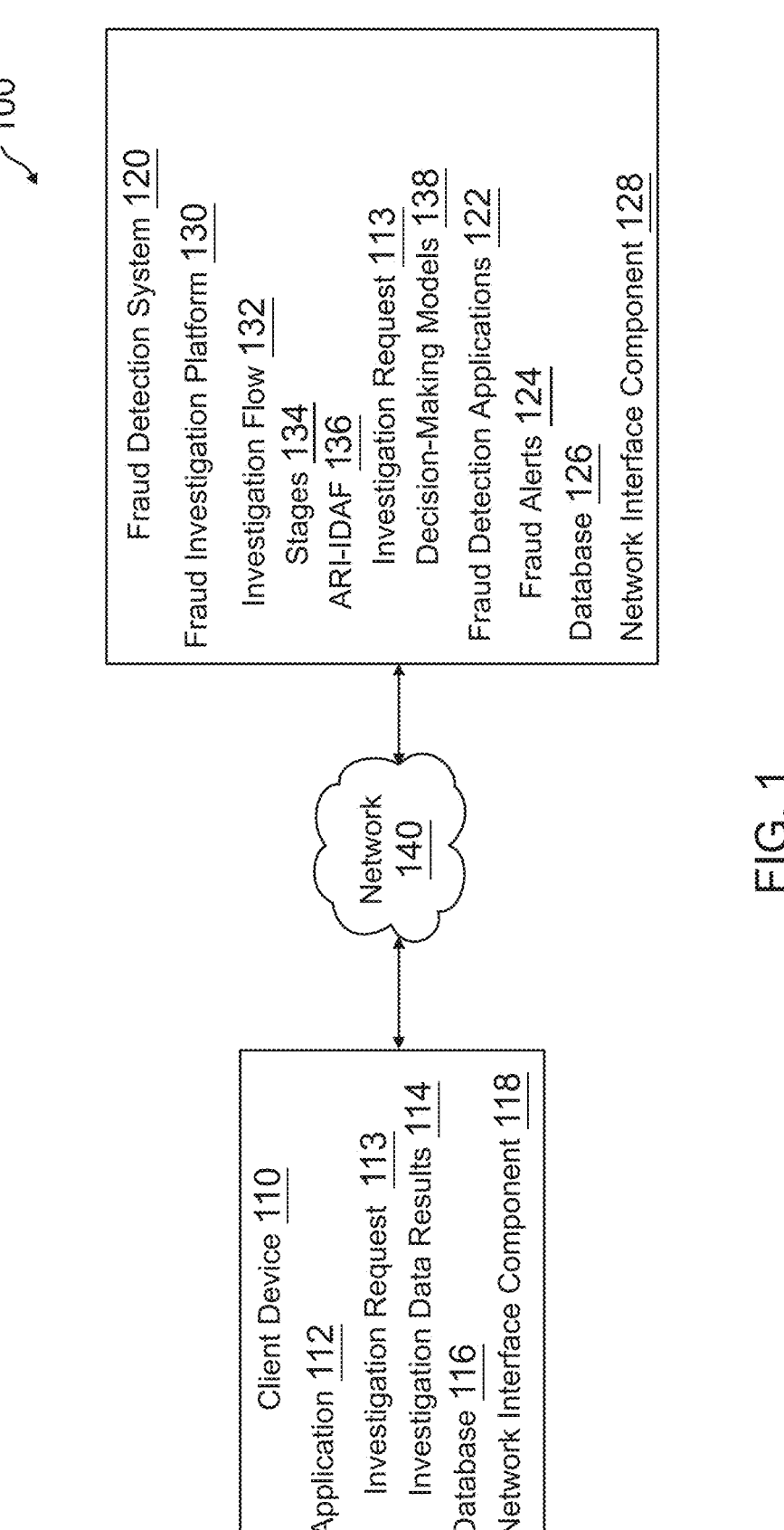
FIG. 1 is a simplified block diagram of a networked environment suitable for implementing the processes described herein according to an embodiment.

This description and the accompanying drawings that illustrate aspects, embodiments, implementations, or applications should not be taken as limiting—the claims define the protected invention. Various mechanical, compositional, structural, electrical, and operational changes may be made without departing from the scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In order to programmatically analyze, assess, and provide recommendations for investigation tasks and data during different investigation stages in an investigation flow, an intelligent and automated computing system and framework may be utilized to process and provide insights, data and data summarizations, content creation, recommendations, and other outputs for fraud investigations that may assist investigators. The evaluation framework may utilize generative and conversational AI, large language models (LLMs), reinforcement ML, recommendation systems, decision-making algorithms, and other related components to create an intelligent and autonomous risk investigation system, hereby referred to as an Autonomous Risk Investigator (ARI). ML algorithms may be utilized for training and enabling the ARI system and framework to learn from large amounts of data and adapt to evolving patterns of financial crime. Trained, online, and/or continuous learning ML models and techniques allow ARI to improve detection capabilities, enhance accuracy, and identify emerging fraud and other risks. ML algorithms may therefore be employed to analyze historical data, identify patterns, and develop predictive ML models that can effectively detect suspicious activities and entities. By leveraging ML, ARI can automatically identify complex relationships and anomalies that may indicate potential financial crime and assist in fraud investigations, thereby augmenting the investigator's ability to more quickly and efficiently protect against illicit activities and properly adjudicate fraud analysis and investigations.

ML models may be built on different tenants of a fraud detection and/or ML modeling system, such as different financial institutions, using historical or past activities, transactions, and/or other model training data. Fraud detection is a process that detects and prevents (i.e., minimizes frequency and/or amount, or completely avoids) fraudsters from obtaining money or property, illegally, through fraud, or other misappropriation. This may include detecting, alerting, and/or blocking fraudsters from obtaining money or property fraudulently, as well as investigations after fraud has been conducted to prosecute those fraudsters, claw back ill-gotten gains, and/or protect from further fraud. Fraudulent activities may include money laundering, cyberattacks, fraudulent banking claims, forged bank checks, identity theft, and other illegal and/or malicious practices and conduct. When implementing ML models for fraud detection, the ML algorithms employed by ARI may include supervised learning, unsupervised learning, and reinforcement learning, or a combination thereof. Through supervised learning, ARI can be trained on labeled data, where known instances of financial crime are used to teach the system to recognize similar patterns and behaviors. Unsupervised learning techniques enable ARI to discover hidden patterns and anomalies in data without relying on pre-labeled information, thereby enhancing ARI's ability to detect emerging risks. Reinforcement learning may allow ARI to learn from investigator feedback and outcomes. By incorporating reinforcement ML techniques, ARI can adapt and refine decision-making processes based on the feedback received from investigators, leading to a continuous improvement cycle and an increasingly effective risk alert investigation system.

Thus, an ARI system may implement an Intelligent Decision Automation Framework (IDAF) utilizing one or more ML models for an intelligent and automated approach to fraud and other risk alert investigations of financial crimes. This may include use of ChatGPT or other generative pretrained transformers (GPTs), LLMs, or the like to provide conversational and/or generative AI during fraud investigations to investigators. For example, an LLM may provide natural language processing to analyze and understand large amounts of textual data related to financial transactions, customer information, regulatory requirements, and other relevant sources. This enables ARI to identify potentially fraudulent or suspicious activities with improved accuracy and efficiency. ARI improves the efficiency, accuracy, and cost-effectiveness of financial crime detection and investigation, allowing financial institutions to combat fraud and money laundering activities proactively. Further, by applying advanced analytics, anomaly detection, behavioral profiling, and network analysis techniques, ARI can identify and flag potential instances of financial crime with higher accuracy and speed compared to conventional investigation processes and systems.

Initially, a fraud investigation and/or a task may be received, which is to be processed and/or completed during a stage of a fraud investigation for an investigation flow. The investigation flow for the fraud investigation may include multiple stages, where, at each stage, different fraud and/or investigation data is collected, assessed, adjudicated on, and/or processed for corresponding investigation outputs and decisions. Since there may be multiple investigations, each at different stages and with different importance and urgency, the IDAF of ARI can intelligently prioritize investigation cases based on risk levels, allowing investigators to allocate their resources effectively and focus on high-priority cases.

Once prioritized, the ML models and other decision-making algorithms and operations of the IDAF may allocate one or more tasks being analyzed by ARI to a specific investigator. Allocation and assignment may be based on investigator factors and parameters for different investigators in a pool of available investigators. Recommendation systems employed by the IDAF may therefore enable intelligent case prioritization, ensuring that the correct (or best for a given task), available, and knowledgeable investigators focus their efforts on the most critical and high-risk cases. Decision-making ML models may further optimize the allocation of investigative resources, facilitating efficient utilization and reducing unnecessary manual intervention.

The decision-making ML algorithm(s) incorporated in the IDAF may assist investigators in making informed decisions by providing data-driven insights, reducing investigative biases, and facilitating consistent and auditable processes. For example, the IDAF may include ML models to determine investigation data used by the task and/or of relevance to the investigator for the investigation stage and/or task requiring investigation evaluation. By leveraging LLMs, the IDAF may provide natural language processing capabilities, allowing the IDAF to analyze and interpret large volumes of textual data with accuracy and speed, thereby identifying and summarizing relevant investigation data. LLMs and other generative AI may learn on past data use when evaluating investigations at different stages and for different tasks. Through reinforcement ML, ARI may continuously learn from investigator feedback and outcomes, enhancing detection capabilities and adapting to evolving financial crime patterns. Thus, reinforcement ML may improve the IDAF's ability to identify and flag fraudulent patterns and anomalies, as well as provide analytics, behavioral profiling, and anomaly detection. ML algorithms may therefore be used to train models to detect complex and hidden patterns that may indicate fraudulent behavior and aid investigators in preventing and mitigating fraud risks.

Using the collected, summarized, and/or processed investigation data, the task and/or investigation data may be orchestrated with different stages and tasks during the investigation flow. For example, data and task evaluation or processing during an evidence-gathering stage may be relevant to other investigators during a collaboration phase to receive additional input and further investigate fraud and/or risk alerts. As such, ARI may orchestrate data between such stages, investigators, and the like, including identifying and summarizing data in different manners and for different stages and investigators, in an automated and intelligent manner. Thereafter, an output of the investigation evaluation, collected and processed data, and task evaluation may be provided by ARI. This may include providing a predicted conclusion of the fraud investigation (e.g., whether fraud or not, cause of fraud, identified fraudster, at fault party, etc.), as well as a narrative and/or data summary causing this conclusion to be intelligently assessed and predicted by ARI.

As such, ARI systems and frameworks implementing these ML models and techniques differ from conventional fraud and risk alert investigation. For example, ML models of the IDAF may facilitate data-driven decision-making, reduce reliance on manual processes, and allow ARI to handle large amounts of data with speed and precision. By integrating these advanced technologies, ARI empowers financial institutions to perform advanced analytics, anomaly detection, behavioral profiling, and network analysis, enabling the identification of complex patterns, hidden relationships, and potential indicators of financial crime. ARI provides improved accuracy and efficiency in investigation data determination, processing, summarization, and handling during different investigation stages, allowing financial institutions to combat financial crime in a proactive and timely manner. This may also reduce false positives while streamlining processes, saving valuable investigator time, resulting in faster decision-making, and leading to optimized resource allocation and increased operational efficiency.

As such, the embodiments described herein provide methods, computer program products, and computer database systems for an ML system that programmatically processes, evaluates, and provides recommendations during fraud and risk alert investigations, such as at different stages in an investigation flow and for different investigation tasks. A financial institution, or other service provider system having one or more financial institutions as customers or other tenants, may therefore include a fraud detection system that may implement an ARI system executing an IDAF as described herein. The framework of intelligent decision automation for fraud and other risk investigations may provide investigators with a powerful tool for effectively evaluating, researching, and adjudicating on fraud investigations. Models may be specifically trained and deployed for investigation prioritization, assignment and allocation to investigations, and data collection, summarization, and processing, which allows for faster and more efficient evaluation of tasks during different stages of the investigation. This provides a comprehensive and systematic approach to assess and process investigations while reducing manual efforts and wasted system resources.

According to some embodiments, in an ML system accessible by a plurality of separate and distinct organizations, ML algorithms, features, and models are provided of an ARI for providing investigation prioritization, allocation, and data processing using an IDAF, thereby providing faster, more efficient, and more precise ML model evaluation and processing of fraud investigations.

Example System and Computing Environment

The system and methods of the present disclosure can include, incorporate, or operate in conjunction with, or in the environment of, an ML engine, model, and intelligent system, which may include an ML or other AI computing architecture that provides automated and programmatic fraud investigations through ML models of an ARI-IDAF (Autonomous Risk Investigator-Intelligent Decision Automation Framework). FIG. 1 is a block diagram of a networked environment 100 suitable for implementing the processes described herein according to an embodiment. As shown, environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, ML models, NNs, and other AI architectures have been developed to improve predictive analysis and classifications by systems in a manner similar to human decision-making, which increases efficiency and speed in performing predictive analysis on datasets requiring machine predictions, classifications, and/or analysis. One or more devices and/or servers may be operated and/or maintained by the same or different entities.

FIG. 1 illustrates a block diagram of an example environment 100 according to some embodiments. Environment 100 may include a client device 110 and a fraud detection system 120 that interact over a network 140 to provide intelligent fraud detection, prevention, and investigation using an ARI system leveraging an IDAF to streamline and optimize fraud and other risk alert investigation processes, as discussed herein. In other embodiments, environment 100 may not have all of the components listed and/or may have other elements instead of, or in addition to, those listed above. In some embodiments, environment 100 is an environment in which a Decision-Making Mechanism (DMM) may execute ML models to orchestrate the tasks, investigation data, and the like between stages and investigators in an investigation flow. As illustrated in FIG. 1, fraud detection system 120 might interact via a network 140 with client device 110 to generate, provide, and output investigation orchestration, data, evaluations, and recommendations during fraud or other risk alert investigations.

For example, in fraud detection system 120, fraud detection applications 122 may process data and return fraud alerts 124 from fraud detection and risk analysis using one or more ML models, such as ML models of ML fraud detection engines that intelligently detect fraud. ML fraud detection engines may use ML models that are trained for fraud detection generally, on a per-tenant basis, and/or based on other training data. The ML models for detecting fraud alerts 124 by fraud detection applications 122 may include offline and/or online ML models, where offline ML models may be trained and deployed based on a training data set and online ML models may provide continuous learning and adaptation to new and changing datasets, such as emerging trends using live or streaming data. As such, fraud detection system 120 may be utilized to provide fraud detection or other ML operations to tenants, customers, and other users or entities via fraud detection applications 124, which may result in fraud alerts 124.

To investigate real or potential fraud being flagged by fraud alerts 124, fraud investigation platform 130 may be invoked and utilized to intelligent orchestrate, manage, process, and assist with evaluating fraud and other investigations, as discussed herein. Fraud detection applications 122 may therefore provide fraud detection services, which may include and/or be utilized in conjunction with computing services provided by and/or to customers, tenants, and other users or entities accessing and utilizing fraud detection system 120. ML fraud detection engines of fraud detection applications 122 may be executed by fraud detection system 120 and/or provided to be utilized with other ML systems and models, such as those managed by separate computing systems, servers, and/or devices (e.g., tenant-specific, or controlled servers and/or server systems that may be separate from fraud investigation platform 130 discussed herein). Client device 110 may include an application 112 that provides an investigation request 113 for a fraud investigation and receives investigation data results 114 including investigation assignments, task and investigation orchestration, and/or investigation data processing, such as investigation data searches, aggregations, and/or intelligent summarization.

Fraud investigation platform 130 may therefore manage an investigation flow 132 for different investigations, investigation flow 132 having stages 134 each corresponding to separate, sequentially linked steps or procedures during fraud or other investigations of fraud alerts 124 by fraud detection applications 122. For example, investigation flow 132 may correspond to a series of steps, operations, and procedures processed, adjudicated on, and/or evaluated at each of stages 134, where stages 134 may include a categorization and prioritization stage, a work allocation stage, a review and enhance stage, an evidence-gathering stage, a collaboration stage, a disposition stage, a suspicious activity report (SAR) and post-decision stage, or any combination thereof. Other investigations, flows, and/or tenants may implement and/or utilize other stages as well. To provide intelligent and efficient investigation processing and evaluation, an ARI-IDAF 136 is further provided, such as an Autonomous Risk Investigator (ARI) leveraging the models and operations provided by a DMM for an IDAF.

In this regard, investigation request 113 may be received by ARI-IDAF 136, which may then be processed using a pipeline or flow of decision-making models 138 and operations of the DMM for ARI-IDAF 136. Initially, this may include intake and processing of investigation request 113 and other investigation data received with investigation request 113, where the investigation and/or corresponding one of fraud alerts 124 for investigation request 113 may be prioritized with other ones of fraud alerts 124 based on their corresponding importance, urgency, and other factors, parameters, or data. After prioritization, decision-making models 138 may be used to allocate the investigation and/or one or more tasks at one or more stages of the investigation to an investigator. ARI-IDAF 136 may use decision-making models 138 to determine and collect investigation data, as well as provide data processing including summarization, identification of important or relevant data portions, objects, files, or the like, and other data processing and manipulation for the investigation and/or investigator. Thereafter, decision-making models 138 may be used to orchestrate the investigation data, tasks, and stages for the investigation during investigation flow 132, which allows for the output of different insights, recommendations, content, and the like for investigation request 113. The operations, components, and models of ARI-IDAF 136, such as those of the DMM of ARI-IDAF 136, are discussed in further detail below with regard to FIGS. 2-5.

For ML models (e.g., decision trees and corresponding branches, NNs, clustering operations, etc.) including decision-making models 138 of the DMM for ARI-IDAF 136, the models may be trained using training data, which may correspond to stored, preprocessed, and/or feature transformed data associated with fraud investigations and investigation flow 132. With continuous and/or reinforcement training, live streaming data from one or more production, live, and/or real-time computing environments and/or feedback from different entities may be used. Model training and configuring may include performing feature engineering and/or selection of features or variables used by ML models. Features or variables may correspond to discreet, measurable, and/or identifiable properties or characteristics, such as those for the data corresponding to investigation request 113, investigation flow 132 including stages 134, investigator factors and/or one or more pools of investigations, investigation prioritization factors and parameters, past investigations, past outcomes and/or outputs of fraud alerts 124 and investigations, and/or other investigation data.

Decision-making models 138 and/or other ML models of fraud detection system 120 may be trained using one or more ML algorithms, operations, or the like for modeling (e.g., including configuring decision trees or neural networks, weights, activation functions, input/hidden/output layers, and the like). Thus, one or more ML models, NNs, or other AI-based models and/or engines may be trained for fraud detection or another ML task. The training data may be labeled or unlabeled for different supervised or unsupervised ML and NN training algorithms, techniques, and/or systems. Fraud detection system 120 may further use features from such data for training, where the system may perform feature engineering and/or selection of features used for training and decision-making by one or more ML, NN, or other AI algorithms, operations, or the like (e.g., including configuring decision trees, weights, activation functions, input/hidden/output layers, and the like).

An ML model may then be trained using a function and/or algorithm for the model trainer, as well as other ML systems, trainers, and operations for model and/or engine training and development. The training may include adjustment of weights, activation functions, node values, and the like. After initial training of ML models using supervised or unsupervised ML algorithms (or combinations thereof), ML models may be evaluated and/or released in a production computing environment. ML models may be deployed to take and process input data for model features and predict labels or other classifiers from the input data. Offline ML models may be released and implemented in a static manner, such as without updating and/or updating through release of new versions that may be deployed at specific times and by bringing one or more of fraud detection applications 122 offline for updating, versioning, patching, and the like. In contrast, deployed online ML models may be initially trained and/or configured for training, and may continuously learn as data is streamed and/or provided during decision-making.

One or more client devices and/or servers (e.g., client device 110 using application 112) may execute a web-based client that accesses a web-based application for fraud detection system 120, or may utilize a rich client, such as a dedicated resident application, to access fraud detection system 120, which may be provided by fraud detection applications 122 to such client devices and/or servers. Client device 110 and/or other devices or servers may utilize one or more application programming interfaces (APIs) to access and interface with fraud detection applications 122 and/or ML fraud detection engines of fraud detection system 120 in order to access, review, and evaluate fraud investigations using the operations discussed herein. Interfacing with fraud detection system 120 may be provided through fraud detection applications 122 and/or fraud investigation platform 130, and may be based on data stored by database 126 of fraud detection system 120 and/or database 116 of client device 110.

Client device 110 and/or other devices and servers on network 140 might communicate with fraud detection system 120 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Communication between client device 110 and fraud detection system 120 may occur over network 140 using a network interface component 118 of client device 110 and a network interface component 128 of fraud detection system 120. In an example where HTTP/HTTPS is used, client device 110 might include an HTTP/HTTPS client for application 112, commonly referred to as a "browser," for sending and receiving HTTP//HTTPS messages to and from an HTTP//HTTPS server, such as fraud detection system 120 via the network interface component.

Similarly, fraud detection system 120 may host an online platform accessible over network 140 that communicates information to and receives information from client device 110. Such an HTTP/HTTPS server might be implemented as the sole network interface between client device 110 and fraud detection system 120, but other techniques might be used as well or instead. In some implementations, the interface between client device 110 and fraud detection system 120 includes load sharing functionality. As discussed above, embodiments are suitable for use with the Internet, which refers to a specific global internet of networks. However, it should be understood that other networks can be used instead of or in addition to the Internet, such as an intranet, an extranet, a virtual private network (VPN), a non-TCP/IP based network, any LAN or WAN, or the like.

Client device 110 and other components in environment 100 may utilize network 140 to communicate with fraud detection system 120 and/or other devices and servers, and vice versa, which is any network or combination of networks of devices that communicate with one another. For example, network 140 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol. Further, one or more of client device 110 and/or fraud detection system 120 may be included by the same system, server, and/or device and therefore communicate directly or over an internal network.

According to one embodiment, fraud detection system 120 is configured to provide webpages, forms, applications, data, and media content to one or more client devices and/or to receive data from client device 110 and/or other devices, servers, and online resources. In some embodiments, fraud detection system 120 may be provided or implemented in a cloud environment, which may be accessible through one or more APIs with or without a corresponding graphical user interface (GUI) output. Fraud detection system 120 further provides security mechanisms to keep data secure. Additionally, the term "server" is meant to include a computer system, including processing hardware and process space(s), and an associated storage system and database application (e.g., object-oriented data base management system (OODBMS) or relational database management system (RDBMS)). It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

In some embodiments, client device 110, shown in FIG. 1, executes processing logic with processing components to provide data used for fraud detection applications 122 and/or fraud investigation platform 130 of fraud detection system 120, such as during fraud investigations of fraud alerts 124 and the like using investigation flow 132 with ARI-IDAF 136. In some embodiments, this may include processing investigation request 113 and providing recommendations and or investigation data decisioning using decision-making models 138. In one embodiment, client device 110 includes application servers configured to implement and execute software applications as well as provide related data, code, forms, webpages, platform components or restrictions, and other information, and to store to, and retrieve from, a database system related data, objects, and web page content. For example, fraud detection system 120 may implement various functions of processing logic and processing components, and the processing space for executing system processes, such as running applications for fraud investigations and/or other risk analysis and fraud detection capabilities. Client device 110 and fraud detection system 120 may be accessible over network 140. Thus, fraud detection system 120 may send and receive data to client device 110 via network interface component 128. Client device 110 may be provided by or through one or more cloud processing platforms, such as Amazon Web Services® (AWS) Cloud Computing Services, Google Cloud Platform®, Microsoft Azure® Cloud Platform, and the like, or may correspond to computing infrastructure of an entity, such as a financial institution.

Several elements in the system shown and described in FIG. 1 include elements that are explained briefly here. For example, client device 110 could include a desktop personal computer, workstation, laptop, notepad computer, PDA, cell phone, or any wireless access protocol (WAP) enabled device or any other computing device capable of interfacing directly or indirectly to the Internet or other network connection. Client device 110 may also be a server or other online processing entity that provides functionalities and processing to other client devices or programs, such as online processing entities that provide services to a plurality of disparate clients. Client device 110 may run an HTTP/ HTTPS client, e.g., a browsing program, such as Microsoft's Internet Explorer or Edge browser, Mozilla's Firefox browser, Opera's browser, or a WAP-enabled browser in the case of a cell phone, tablet, notepad computer, PDA or other wireless device, or the like. According to one embodiment, client device 110 and all of its components are configurable using applications, such as a browser, including computer code run using a central processing unit such as an Intel Pentium® processor or the like. However, client device 110 may instead correspond to a server configured to communicate with one or more client programs or devices, similar to a server corresponding to fraud detection system 120 that provides one or more APIs for interaction with client device 110.

Thus, client device 110 and/or fraud detection system 120 and all of their components might be operator configurable using application(s) including computer code to run using a central processing unit, which may include an Intel Pentium® processor or the like, and/or multiple processor units. A server for client device 110 and/or fraud detection system 120 may correspond to Window®, Linux®, and the like operating system server that provides resources accessible from the server and may communicate with one or more separate user or client devices over a network. Exemplary types of servers may provide resources and handling for business applications and the like. In some embodiments, the server may also correspond to a cloud computing architecture where resources are spread over a large group of real and/or virtual systems. A computer program product embodiment includes a machine-readable storage medium (media) having instructions stored thereon/in which can be used to program a computer to perform any of the processes of the embodiments described herein utilizing one or more computing devices or servers.

Computer code for operating and configuring client device 110 and fraud detection system 120 to intercommunicate and to process webpages, applications and other data and media content as described herein are preferably downloaded and stored on a hard disk, but the entire program code, or portions thereof, may also be stored in any other volatile or non-volatile memory medium or device, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/ IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Autonomous Risk Investigator-Intelligent Decision Automation Framework

Figure 2:
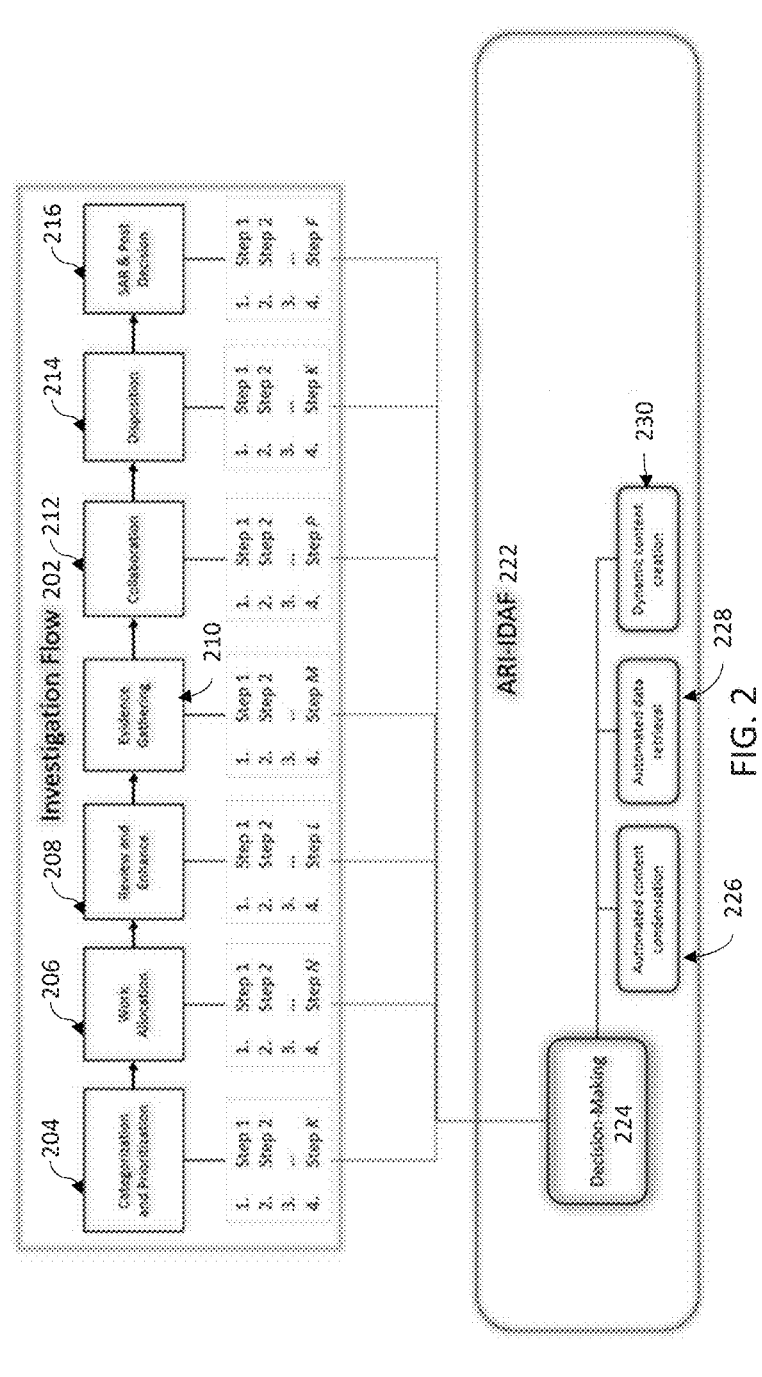
FIG. 2 is a simplified diagram of an investigation flow where an Autonomous Risk Investigator-Intelligent Decision Automation Framework may be implemented to automate fraud investigation tasks during different investigation stages according to some embodiments.

FIG. 2 is a simplified diagram 200 of an investigation flow where an Autonomous Risk Investigator-Intelligent Decision Automation Framework may be implemented to automate fraud investigation tasks during different investigation stages according to some embodiments. Diagram 200 of FIG. 2 includes an investigation flow 202 having stages 204-216, which may be managed by an ARI-IDAF 222 during one or more fraud investigations. In this regard, ARI-IDAF 222 may be executed by the operations and components of fraud detection system 120 including fraud investigation platform 130 discussed in reference to environment 100 of FIG. 1. In this regard, diagram 200 displays the interactions of ARI-IDAF 222 for purposes of investigation data decision during fraud and other risk alert investigation processing and assistance.

Stages 204-216 may correspond to the different stages investigated and analyzed during investigation flow 202 for a fraud alert and/or other alert of risk, money laundering, theft, or the like. For example, stage 204 may include categorization and prioritization, stage 206 may include work allocation, stage 208 may include review and enhancement, stage 210 may include evidence gathering, stage 212 may include collaboration, stage 214 may include disposition, and stage 216 may include suspicious activity report (SAR) creation and/or decision posting. Additionally, more, less, and/or different stages may also be incorporated with investigation flow 202 or other investigation flows for different investigations, types of investigations, tenants or customers, and/or fraud domains. Each of stages 204-216 further may include steps for stage completion and/or analysis of the fraud alert and/or investigation data, where the steps may correspond to one or more tasks for completion. As such, ARI-IDAG 222 may automate and provide decisioning on such tasks to assist investigators with stages 204-216 of investigation flow 202. The tasks utilized to process and/or complete the steps toward the goals and/or objectives of stages 204-216 are discussed in further detail with regard to FIG. 4 below.

ARI-IDAF 222 includes a decision-making mechanism (DMM) 224 having one or more rule-based logic engines and/or ML models trained for investigation data processing and data decisioning. ML models and/or rules for fraud investigation assistance, such as prioritization, allocation, data collection or aggregation, data condensation or summarization, content creation, and/or data and task orchestration may be trained and created using one or more ML algorithms, rule writer and/or data scientist configurations, and historical training data. This allows the logic and/or models to provide intelligent outputs, such as classifications, decision-making, predictions and the like, in an automated manner without user input or intelligence. These models attempt to mimic human thinking by learning from the past historical training data to make correlations, predictions, and interpretations based on pattern analysis and the like. ML models may correspond to different types of classifications of models, such as NNs, tree-based models, clustering models, etc. For example, with decision trees, a tree model may be used where each decision path from the "root" of the tree to a "leaf" may serve as a rule. The rule's maximum complexity may be given by the tree's maximum depth. With neural networks, layers may be trained having nodes with activation functions and weights that are interconnected between layers to resemble neurons and mimic human thinking through feed forward and/or backwards propagation networks.

For ML model training, supervised, unsupervised, and/or reinforcement learning may be used in order to learn from the past historical data, as well as positive and negative experiences and/or feedback for investigation assistance, data decisioning, and the like. This training data may be associated with financial crime detection and fraud or other risk alert investigation. Reinforcement learning may also provide an explainable AI, which allows for provision and identification of the underlying rationale behind decisions and outputs by ARI-IDAF 222 when executing DMM 224 with stages 204-216 of investigation flow 202 and the corresponding tasks. DMM 224 may also include ChatGPT-like models, including one or more LLMs, GPTs, or other conversational and/or generative AIs that provide recommendations and personalized items, content, or the like for particular investigators based on preferences, behaviors, and the like.

In this regard, DMM 224 may include collaborative filtering, content-based filtering, and hybrid models that analyze and understand patterns in risk alert investigation data based on factors such as transactional behavior, customer profiles, previous investigation outcomes, and regulatory guidelines. Generative AI and LLMs may also allow DMM 224 to process and analyze large amounts of textual data, including transactional records, customer information, regulatory guidelines, and external data sources. LLMs and the like may extract relevant insights, identify patterns, and detect potential instances of financial crime, for example, by understanding context, semantics, and intent to uncover suspicious activities, relationships, and behaviors. LLMs and other generative AI may also learn based on investigation outputs and investigator feedback, as well as other past experiences.

Recommendation systems, ML models, and other AI of DMM 224 may provide prioritization and resource allocation, which may include prioritizing cases, highlighting ones with the highest potential risk and impact, and ensuring optimal utilization of resources. Further, DMM 224 may provide for recommendations of investigation data, content condensation and/or creation from data retrieval, and the like. In some embodiments, additional features may be implemented with ARI-IDAF 222 including rules-to-text processing, assessments of precision of text summarizations, assessments of quality of text summarizations, transaction-to-narrative processing, tabular data summarization, and/or conclusion extraction from text. With DMM 224, decision-making algorithms may be implemented to make intelligent decisions based on various factors, including risk levels, case complexity, resource availability, and investigator expertise. These allow DMM 224 to dynamically allocate investigative resources, ensuring that high-risk cases receive appropriate attention and optimal utilization of available resources. The algorithms may consider multiple factors, such as the urgency of the investigation, the potential impact of the financial crime, and the expertise of investigators, to make informed decisions and prioritize cases accordingly.

As such, ARI-IDAF 222 may correspond to a composite of multiple components designed to perform specific tasks for stages 204-216. DMM 224 may orchestrate investigation flow 202 using historical data, investigator experiences, and the intrinsic properties of each alert to make informed decisions, such as by assessing the current state of the investigation, evaluating the available resources (both human and computational), and determining the optimal course of action. DMM 224 may therefore provide an automated content condensation 226, an automated data retrieval 228, and a dynamic content creation 230 through an algorithmic foundation relying on a hybrid and/or combination ML model approach. DMM 224 may also include a rules-to-text processor, an assessment of text summarization precision, an assessment of text summarization quality, a transaction to narrative conversion, a tabular data summarization, or an extraction of a text conclusion. This may utilize deterministic logic with probabilistic reasoning, as shown in FIGS. 3A and 3B below.

Figure 3A:
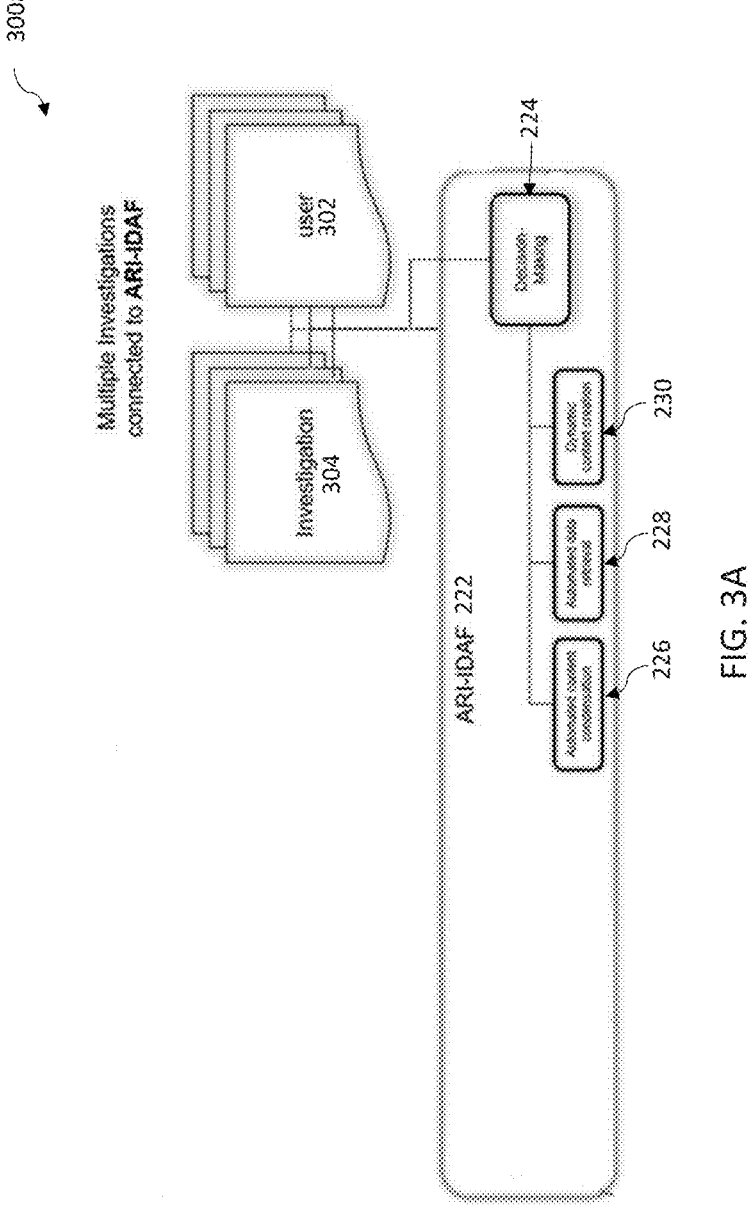
FIGS. 3A and 3B are simplified diagrams of inputs and outputs for an Autonomous Risk Investigator-Intelligent Decision Automation Framework during fraud investigation automation and intelligent decision-making according to some embodiments.
Figure 3B:
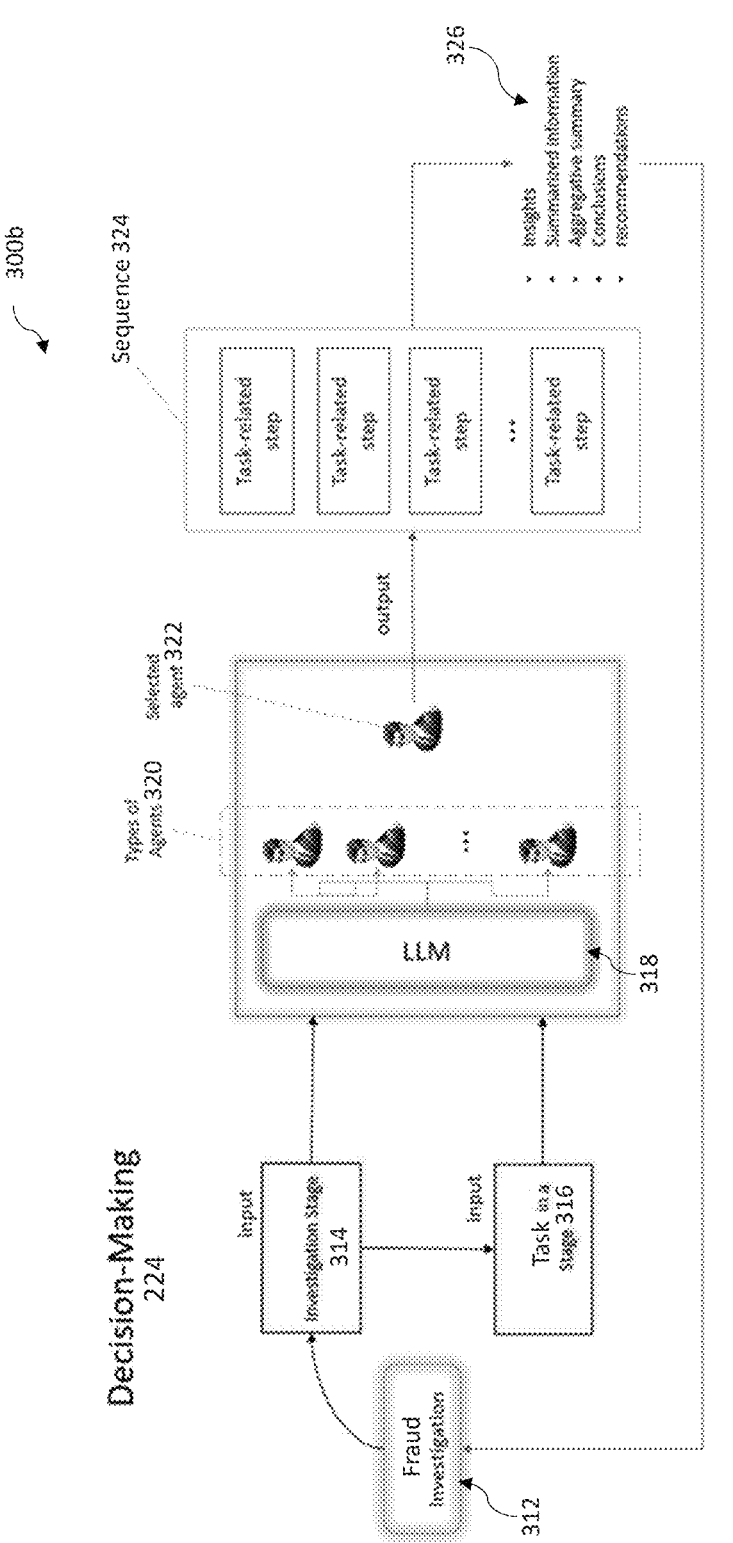

FIGS. 3A and 3B are simplified diagrams 300a and 300b of inputs and outputs for an Autonomous Risk Investigator-Intelligent Decision Automation Framework during fraud investigation automation and intelligent decision-making according to some embodiments. In diagrams 300a and 300b, ARI-IDAF 222 and DMM 224 are shown in further detail. In this regard, ARI-IDAF 222 including DMM 224 may be executed by fraud investigation platform 130 from environment 100 of FIG. 1, such when providing investigation data decisioning during fraud investigations.

Referring now to diagram 300a of FIG. 3A, ARI IDAF 222 is shown interacting with a user 302 during an investigation 304 for streamlining and optimizing investigation processes by processing inputs and providing outputs shown using a corresponding computing architecture. ARI-IDAF 222 shown in diagram 300a may be provided by a distributed architecture that allows for multiple different ongoing investigations to be handled simultaneously. As such, investigation 304 may correspond to one of those investigations that may be encapsulated in a separate environment for investigation data processing and decisioning, which may include allocation and usage of dedicated resources and an instance of DMM 224 for automated content condensation 226, automated data retrieval 228, and dynamic content creation 230. This modular approach may include isolation of investigation 304 and interactions user 302 with ARI-IDAF 222 for the investigation so that potential interference or data leakage between concurrent investigations may be prevented. Resource allocation may be provided to dedicate specific resources to each investigation to ensure that ARI-IDAF 222 and/or DMM 224 may have the computational power and memory required to avoid bottlenecks and ensure timely completion.

To provide automated content condensation 226, automated data retrieval 228, and dynamic content creation 230 by DMM 224, ARI-IDAF 222 may perform load balancing, elastic scalability, parallel processing, statement management, and integration with external systems for data retrieval, collection, and condensation. These operations may also ensure that ARI-IDAF 222 is update-to-date and remains versatile and adaptable to changing fraud patterns, financial crimes, and the like. For example, with load balancing, a load balancer of ARI-IDAF 222 may distribute alerts and fraud investigations when received across available instances of DMM 224 to prevent individual instances of DMM 224 from becoming a bottleneck. This may include monitoring system health and performance of each instance of DMM 224 to redirect alerts from instances that may be overloaded, under duress, and/or undergoing maintenance.

With elastic scalability, ARI-IDAF 222 may also include operations to scale up and down depending on demand by providing new instances of DMM 224 and/or reducing instances of DMM 224 when not needed. During periods of high demand, ARI-IDAF 222 can automatically provision additional DMM instances and, conversely, scale down during lower demand to optimize resource usage and cost.

To further enhance scalability, ARI-IDAF 222 may employ data partitioning techniques such that large datasets may be partitioned, separated, and/or broken down to be distributed across multiple storage units for faster access and processing.

Within each instance of DMM 224, tasks that are not dependent on each other (e.g., relying on a data output of one task for completion of the next task) may be processed in parallel to reduce the time taken for investigations, especially during data-intensive tasks such as evidence gathering and/or external data retrieval. ARI-IDAF 222 may also include a distributed state management system, which may track progress of each state of the investigation, including completed tasks, interim findings, and/or allocated resources. In the event of system failures or restarts, the state management system may be utilized to resume the investigation from a last state to ensure data integrity and consistency.

To integrate with external systems that provide data to automated content condensation 226, automated data retrieval 228, and dynamic content creation 230, ARI-IDAF 222 may provide application programming interface (API) integrations, data pipelines, web scraping mechanisms, third-party analytical tools integration, security protocols, a modular integration framework, and/or data mappings and transformations. For example, with API integrations, ARI-IDAF 222 may utilize Representational State Transfer (RESTful) APIs to facilitate communication between DMM 224 and external databases, web services, and other platforms. RESTful APIs allow for real-time data retrieval, updates, and synchronization. For systems that support event-driven architectures, webhooks may be utilized, which allow ARI-IDAF 222 to receive instant notifications of events or changes in external systems.

Data pipelines provided by ARI-IDAF 222 for DMM 224 may include Extract, Transform, and Load (ETL) processes that fetch data from different data sources, process the data into a consistent format, and then load the data into ARI-IDAF 222 for processing when providing automated content condensation 226, automated data retrieval 228, and dynamic content creation 230. ARI-IDAF 222 may also utilize streaming data pipelines and data streamers to integrate with data streaming platforms for real-time streaming data. However, with data from sources that may not provide direct API access, ARI-IDAF 222 may utilize advanced and intelligent web scraping tools to navigate web structures and resources, extract relevant data, and provide the data to DMM 224. Data retrieved from external sources using these aforementioned components and operations may be processed using automated content condensation 226, automated data retrieval 228, and dynamic content creation 230 for management and investigation data decisioning.

However, fraud investigations typically also rely on financial data, which may be regulated by data security rules, laws, regulations, and/or policies. For example, financial data is sensitive in nature and therefore the integration, output, and/or reporting mechanisms may utilize robust security protocols including Secure Sockets Layer (SSL) and/or transport layer security (TLS) encryption for data in transit. OAuth standard authentication and access delegation may be used for authentication of users, applications, systems, and the like. Further, security audits at different intervals or schedules may be performed to identify and rectify potential or known vulnerabilities. The IDAF of ARI-IDAF 222 may be modular such that external systems or tools may be integrated into the system seamlessly through modular components that may be added, removed and/or updated without affecting other components. To provide coherent and usable data from external sources for automated content condensation 226, automated data retrieval 228, and dynamic content creation 230, ARI-IDAF 222 may utilize data mapping and transformation tools that automatically detect discrepancies in data structures, formats, or terminologies and resolve these to ensure data consistency and reliability.

Referring now to diagram 300b of FIG. 3B, DMM 224 is shown in further detail providing outputs for a fraud investigation 312. Initial input to DMM 224 may include an investigation stage 314 and a task 316 at the corresponding stage. DMM 224 may include an LLM 318, which may process different data to provide outputs for task 316 at investigation stage 314. For example, during agent selection and investigation allocation to an investigator, types of agents 320 may be processed by LLM 318 of DMM 224 to determine a selected agent 322. An output of selected agent 322 may be provided for determination of a sequence 324, which may include task-related steps that may be recommended for task completion of task 316. With sequence 324, recommendations 326 may be output by DMM 224, which may include insights, summarized information, aggregative summaries, conclusions, and other recommendations as determined by LLM 318 or other generative AI and/or ML model of DMM 224.

DMM 224 employs a hybrid decision framework that merges rule-based logic with machine learning models. With rule-based logic, a deterministic component may be utilized to ensure that DMM 224 follows predefined protocols, regulatory standards, and best practices. The deterministic component operates based on a set of if-then-else rules derived from domain expertise and regulatory guidelines. The machine learning models and component may correspond to a probabilistic component that allows DMM 224 to learn from past investigations and adapt decision-making processes using supervised and/or unsupervised training, as well as reinforcement learning. For example, supervised learning ML models trained on historical investigation data (including labeled and/or annotated training datasets) may be used to predict the optimal actions for new alerts.

As such, the rule-based logic and ML models may be used to process the inputs shown in diagram 300b for DMM 224 (e.g., investigation stage 314 and task 316) and provide corresponding outputs, such as selected agent 322, sequence 324, and/or recommendations 326 for fraud investigation 312. DMM 224 may also be deployed with algorithmic logic for processing. For example, in order to evaluate fraud investigation 312 during investigation stage 314 and for task 316 in that stage, DMM 224 may utilize a weighted evaluation function with LLM 318. The weighted evaluation function may be computed using the following Equation 1:

Given an alert A, DMM 224 evaluates:

$$F(A) = w_1 \times R + w_2 \times D + w_3 \times H \qquad \text{Equation 1:}$$

Where:

R is a risk score.

D is a date.

H is a historical context. H represents a quantified measure of the alert's historical context, derived from similar past alerts and their outcomes $w_1$, $w_2$, and $w_3$ are weights that determine the importance of risk score, date, and historical context, respectively.

To ensure that the system remains responsive to changes with financial crimes and evolving trends or patterns, the weights w1, w2, and w3 may be dynamic and periodically adjusted based on feedback loops and performance metrics.

This adaptive weight adjustment ensures that DMM 224 adjusts and applies an importance to different factors based on changes with fraud and other financial crimes. DMM 224 incorporates a contextual analysis module that evaluates a context of a fraud alert by analyzing transaction patterns, relationships with other entities, and external data sources. DMM 224 may use the contextual analysis during prioritization and other processing of fraud investigation 312. Post-investigation feedback for an investigation and/or investigation data decision during fraud investigation 312 may be integrated with DMM 322 for refinement of decision-making processes, models, and the like periodically or continuously with online learning and/or reinforcement learning. Using reinforcement learning techniques, DMM 224 may learn from the outcomes of past decisions to improve future ones, becoming more accurate and efficient over time.

Figure 4:
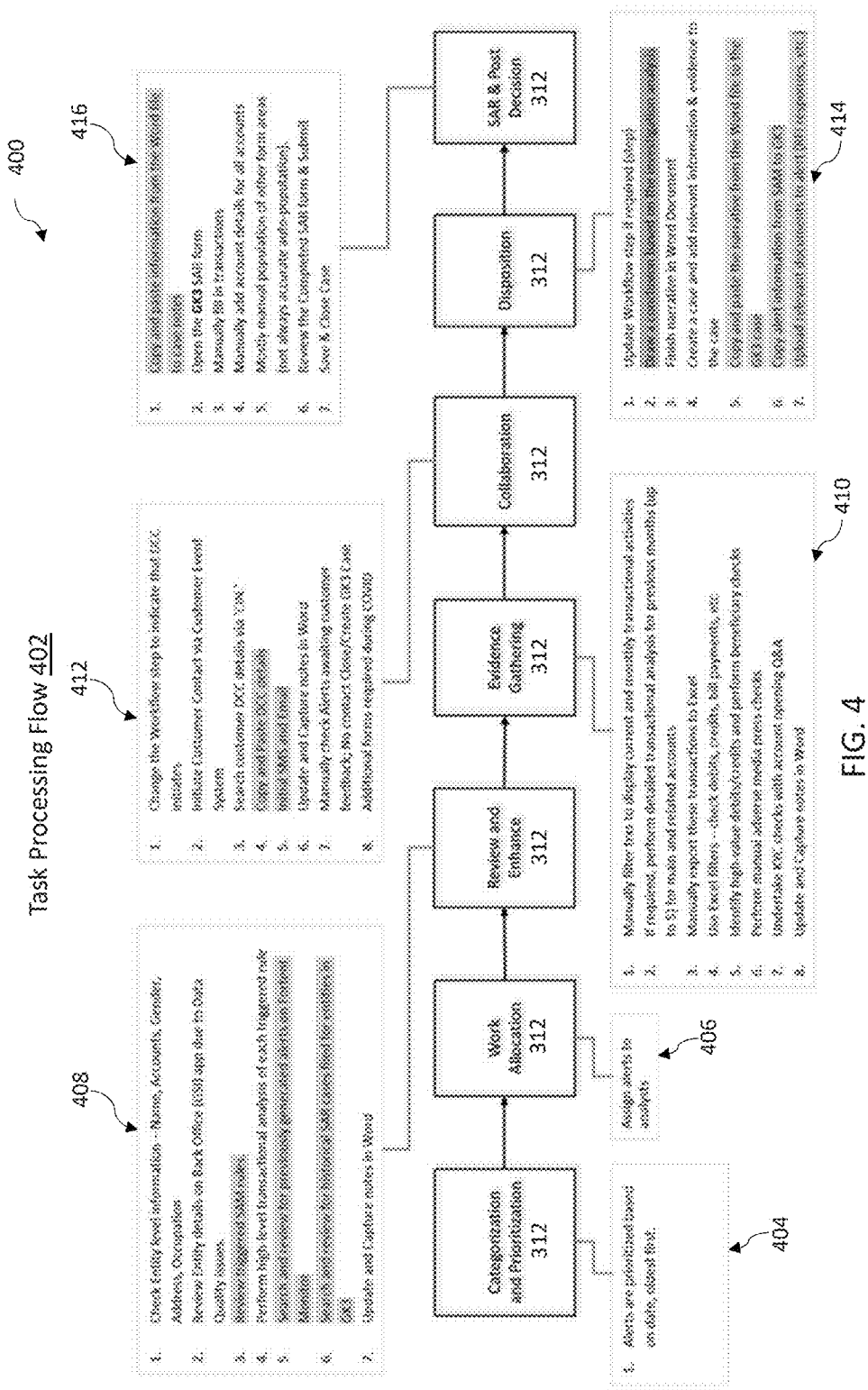
FIG. 4 is a simplified diagram of the automation of tasks during investigation stages by ML models of an Intelligent Decision Automation Framework according to some embodiments.

FIG. 4 is a simplified diagram 400 of the automation of tasks during investigation stages by ML models of an Intelligent Decision Automation Framework according to some embodiments. Diagram 400 of FIG. 4 includes tasks and corresponding steps that may be processed by ML operations to programmatically perform fraud investigation data decisioning, such as those decisions and other outputs by ARI-IDAF 322 during stages 204-216. As such, a task processing flow 402 in diagram 400 may be performed by investigation platform 130 of fraud detection system 120 discussed in reference to environment 100 of FIG. 1. In this regard, task processing flow 402 in diagram 400 includes tasks 404-416 at stages 204-216.

In diagram 400, stage 204 of investigation flow 202 includes categorization and prioritization of a fraud investigation, where tasks 404 may correspond to assessing the intrinsic properties of the fraud alert, such as a risk score, date, and historical context. Using the weighted evaluation function, DMM 224 may prioritize the alert in a queue of pending investigations. Once an alert is prioritized, DMM 224 may move to stage 206 for work allocation where tasks 206 may be used to evaluate the available investigators' expertise, past performance, current workload, and other relevant factors, and any combination thereof. DMM 224 may then assign the alert and investigation to the most suitable investigator using deterministic rules and probabilistic ML models.

During stage 208, tasks 408 may be evaluated and processed by DMM 224 to provide review and enhancement of available alert data. Tasks 408 may review available data and enhance the data using external data sources and the like that may enrich initially provided and/or available data. With some alerts, another application or resource associated with a Global Security Intelligence (GSI) may be reviewed for data quality issues. Suspicious Activity Monitoring (SAM) rules that have been triggered may also be reviewed. Historical SAR cases filed for entities that are part of GK3 (e.g., fraud systems providing advanced analytics to identify suspicious patterns and anomalies in financial crimes) may be searched and reviewed for tasks 408. DMM 224 during task processing flow 402 may the proceed to stage 210 for evidence gathering through tasks 410. Tasks 410 may be automated by DMM 224 to filter transactions for the fraud alert and investigation, analyze the transactions for the different involved accounts, users, and/or entities, export the transactions to a data table for visualization and searching, perform checks on the data, and perform searches and data retrievals from connected and/or available data resources. Know your customer (KYC) checks may be performed with account opening questions and answers (Q&A).

Task recommendation flow 402 may then proceed to collaboration with other investigators, entities, customers, and the like during tasks 412 for stage 212. Collaboration may involve other available and/or potential sources of data to enrich the fraud investigation with data that may not be directly available from a data resource. Data Collection and Confirmation (DCC) may collect and confirm customer data to ensure accuracy and timeliness (e.g., up-to-date data), where workflow steps may be changed to indicate that the DCC has initiated. As such, the DCC may be searched for customer details using a Customer Identifier (CID), and DCC details may be provided via email, SMS (or other text message), and the like. DMM 224 may utilize one or more automated operations for outreach during tasks 412. Thereafter, DMM 224, during task processing flow 402, may make a deterministic disposition on the investigation through tasks 414 at stage 214. For example, DMM 224 may utilize one or more ML models including a generative AI to draw a conclusion and create a narrative, as well as provide the relevant information and evidence. This may include uploading relevant documents to an alert including Request for Information (RFI) responses and the like. Finally, during stage 216, tasks 416 may be used to open, complete, and post a SAR and decision on the SAR. This may be automated in part or fully by the generative AI and other ML models of DMM 224.

DMM 224 may further execute operations for orchestrating the flow of tasks 404-416. DMM 224 may continuously monitor the state of each task, evaluate the results of completed tasks, and anticipate the requirements of upcoming tasks. If anomalies or bottlenecks are detected, DMM 224 may dynamically adjust the flow, reassign tasks, and/or allocate additional resources. For example, if during the "evidence gathering" of stage 210, DMM 224 detects that a particular piece of evidence requires specialized analysis, DMM 224 may automatically route that task to an investigator with the relevant expertise. After task completion, investigators can provide feedback on the task's complexity, challenges faced, and any additional insights. DMM 224 may integrate this feedback in real-time for refining subsequent decisions using reinforcement learning. Upon reaching the final stages of the investigation, DMM 224 may provide systematic collection and creation of evidence and findings in viewable and/or processable formats, files, and/or visualizations including automating the generation of reports. For example, DMM 224 may automatically populate standard fields in reports, reducing manual intervention and potential errors. DMM 224 may be designed to be a continuous learning system so that, as more investigations are completed, DMM 224 assimilates the outcomes and feedback to refine its decision-making algorithms and models.

As such, DMM 224 within ARI-IDAF 222 may be designed to provide a structured and flexible flow and control mechanism, allowing for dynamic adjustments based on real-time data and insights. Thus, ARI-IDAF 222 may streamline operations and ensure that each decision is data-driven, informed, and consistent. This reduces the margin for human error, enhances the quality of investigations, and ensures a higher degree of regulatory compliance. Furthermore, ARI-IDAF 222 may learn from past investigations and continuously refine models to remain adaptive to emerging threats and patterns in financial crime. Through external data sources, analytical tools, and reporting mechanisms, ARI-IDAF 222 may provide a holistic approach to investigations, where all types and sources of different pieces of evidence, data points, and analytical insights are considered.

Figure 5:
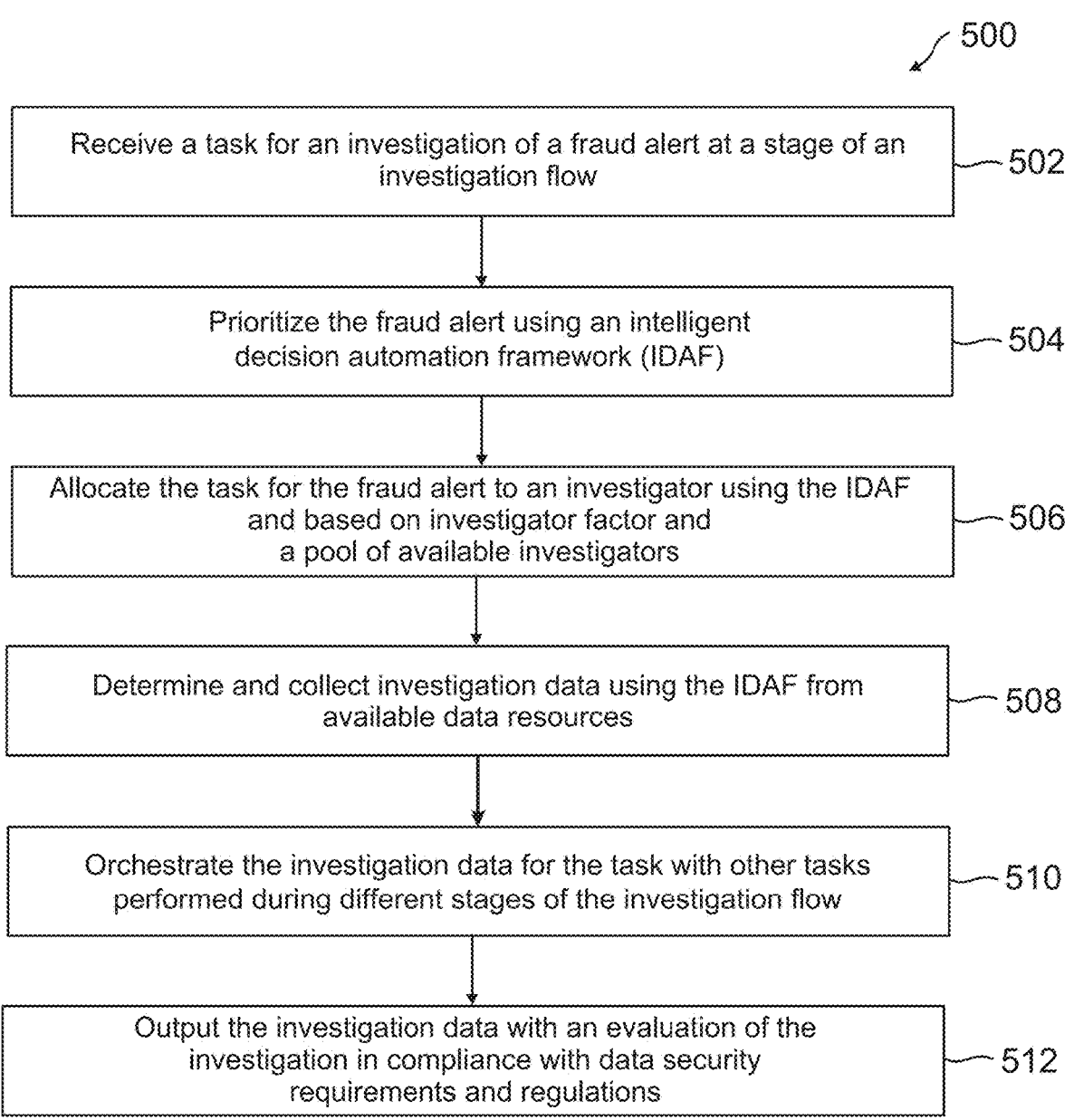
FIG. 5 is a simplified diagram of an exemplary flowchart executed by an Autonomous Risk Investigator-Intelligent Decision Automation Framework when performing investigation data decisioning and other task automation for fraud investigations according to some embodiments.

FIG. 5 is a simplified diagram of an exemplary flowchart 500 executed by an Autonomous Risk Investigator-Intelligent Decision Automation Framework when performing investigation data decisioning and other task automation for fraud investigations according to some embodiments. Note that one or more steps, processes, and methods described herein of flowchart 500 may be omitted, performed in a different sequence, or combined as desired or appropriate based on the guidance provided herein. Flowchart 500 of FIG. 5 includes operations executable by an ARI-IDAF that performs investigation data decisioning and provides recommendations and other automated assistance during fraud investigations, as discussed in reference to FIG. 1-4. One or more of steps 502-512 of flowchart 500 may be implemented, at least in part, in the form of executable code stored on non-transitory, tangible, machine-readable media that when run by one or more processors may cause the one or more processors to perform one or more of steps 502-512. In some embodiments, flowchart 500 can be performed by one or more computing devices discussed in environment 100 of FIG. 1.

At step 502 of flowchart 500, a task for an investigation of a fraud alert at a stage of an investigation flow is received. A task may correspond to a request from an investigator, entity involved in a fraud report or alert, entity adjudicating the fraud report or alert, and/or another user and/or representative of an entity that is associated with a fraud investigation and is seeking to evaluate and resolve the investigation (e.g., whether fraud occurs, was properly detected, who/what caused the fraud, what was compromised, how the fraud and/or attack occurs, the frequency of that type of fraud and whether that type might be a single entity, multiple independent entities, or multiple associated entities, etc.). The task may also be automatically generated and sent for processing during an investigation flow by an autonomous fraud investigation system or process, such as an ARI system that processes and evaluates fraud to assist investigators in efficient and accurate fraud investigations and resolutions. In this regard, the task may require investigator assignment, data collection or aggregation, data processing and/or summarization, task orchestration with the stage or other stages of the investigation flow, and the like. As such, the ARI-IDAF may be invoked to handle and process the task.

At step 504, the fraud alert is prioritized using an IDAF, such as by an ARI system that implemented the IDAF having one or more DMMs that utilize ML models and the like for investigation data decisioning. Initially, the fraud alert may be received for an investigation with other fraud alerts, which may require prioritization based on different alert factors and parameters, such as those associated with importance (e.g., value, tenant or customer, type or avenue of fraud or attack, etc.), urgency, timeliness, difficulty or likelihood of resolution, resources used to resolve, resolution timelines and/or agreements, or any combination of the aforementioned factors and parameters. To balance such factors in an autonomous and intelligent manner, an ML model of the DMM may process features for the various factors and parameters that prioritize the fraud alerts and corresponding investigations to intelligently rank, prioritize, and/or order in queue, the fraud alert and investigation with other such alerts and investigations being processed.

At step 506, the task for the fraud alert is allocated to an investigator using the IDAF and based on investigator factors and a pool of available investigators. After prioritizing, once the investigation of the fraud alert is being processed by the ARI-IDAF, another ML model of the DMM may perform task and/or investigation assignment to a particular investigator for handling and evaluation. In this regard, a pool of investigators may be identified, and each investigator in the pool may have corresponding factors for investigator selection and fraud investigation evaluation. For example, the factors for investigators may be associated with availability, expertise, past fraud investigations, performance and/or performance reviews, and/or other indicators of an investigator's ability in handling a particular task and/or investigation. As such, in addition to processing features associated with the investigators, the ML model may also process features of the task and/or fraud investigation, such as the stage being evaluated and/or processed in the investigation flow, the requirements of the task, and/or available fraud data for the investigation. Allocation to an investigator may include assigning and populating the task in a dashboard, home screen, message, and/or notification to the investigator. When assigning, an LLM, GPT, or the like may be used to provide conversational notifications and/or dialogue to the assigned investigator of the investigation and/or task for handling (e.g., investigation data summarization to the current task, alert of the task for handling, etc.).

At step 508, investigation data is determined and collected using the IDAF from available data resources. In this regard, the ARI-IDAF may be connected to different data sources, databases, streaming data, applications, and/or the like that may be used to determine and/or collect data for the investigation and the task being processed. The ARI-IDAF may include one or more LLMs, GPT-based generative and/or conversational AIs, and the like that may be used to process received queries and/or requests from the investigator and/or generate such queries and requests based on the task. These AIs may search for corresponding investigation data from the available data resources. Based on the search results and/or identified investigation data, the LLM or other generative AI may also provide intelligent and autonomous summarization operations to select relevant and important portions of the data, which may then be output to the investigator for the task and during the stage of the investigation flow. The LLM or other generative AI may also provide dynamic content creation based on the search results, such as data comparisons, data inferences, links between different correlated data, and/or data visualizations that may assist an investigator in content review of investigation data.

At step 510, the investigation data for the task is orchestrated with other tasks performed during different stages of the investigation flow. After collecting, aggregating, summarizing, and/or performing other data processing operations for the investigation data, the ARI-IDAF may orchestrate the data with other stages and tasks being handled for the investigation flow. For example, coordination between different stages may allow for data to be expanded upon and contextualized in the broader investigation timeline and flow, which allows more accurate and efficient evaluation and resolution. In this regard, data from the different stages may be correlated and tasks orchestrated so that the same or different investigators may have access to the investigation data collected and/or created by the ARI-IDAF.

At step 512, the investigation data is output with an evaluation of the investigation in compliance with data security requirements and regulations. In this regard, an output of the investigation data may be provided in a dashboard, interface, or notifications of different investigators and/or entities that may review the fraud investigation and be required to act on the results of the fraud investigation. The ARI-IDAF may receive an evaluation from one or more investigators, and may also or instead make predictions or decisions regarding the evaluation of the investigation using one or more ML models of the DMM. With the evaluation, the evaluated criteria and investigation data may be provided and/or highlighted for review, for example, in a narrative or data summary of relevant and utilized data for the conclusion and evaluation of the fraud investigation. However, any output investigation data may also be regulated and controlled from output and/or provision to users or entities based on data privacy requirements and other data security regulations governing for the entity, location or region, applicable law and jurisdiction, and the like. As such, data security parameters and requirements may be enforced when outputting investigation data and/or evaluations of fraud investigations.

As discussed above and further emphasized here, FIGS. 1, 2, 3A, 3B, 4, and 5 are merely examples of fraud detection system 120 and corresponding methods for an ARI-IDAF that provides fraud investigation data decisioning and recommendations, which said examples should not be used to unduly limit the scope of the claims. One of ordinary skill in the art would recognize many variations, alternatives, and modifications.

Figure 6:
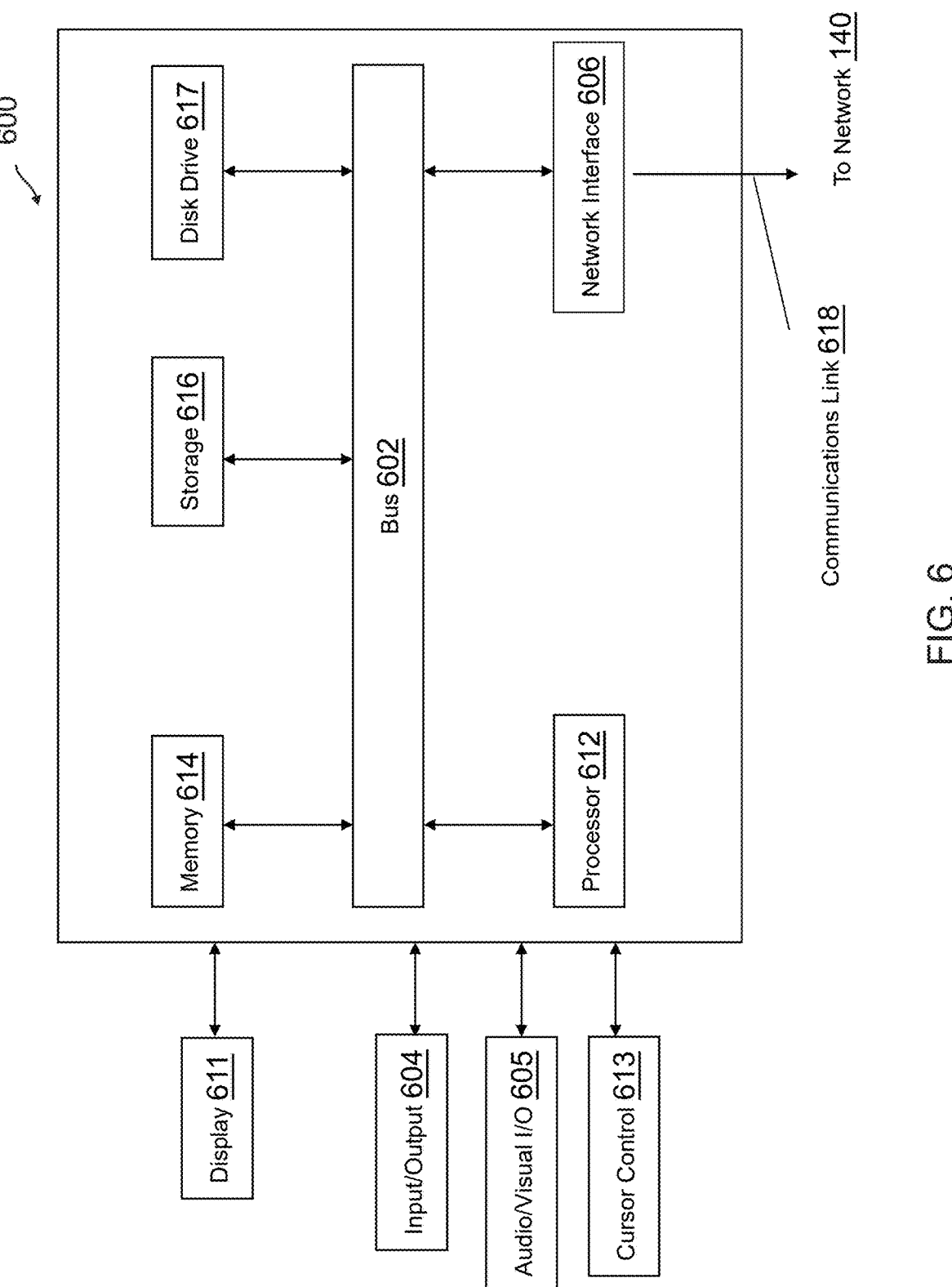
FIG. 6 is a simplified diagram of a computing device according to some embodiments.

FIG. 6 is a block diagram of a computer system 600 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio/visual input/output component 605 may also be included to allow a user to use voice for inputting information by converting audio signals. Audio/visual I/O component 605 may allow the user to hear audio, and well as input and/or output video. A transceiver or network interface 606 transmits and receives signals between computer system 600 and other devices, such as another communication device, service device, or a service provider server via network 140. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. An autonomous risk investigation (ARI) system configured to automate investigation tasks during a plurality of investigation stages using an intelligent decision automation framework (IDAF), the ARI system comprising:

a processor and a computer readable medium operably coupled thereto, the computer readable medium comprising a plurality of instructions stored in association therewith that are accessible to, and executable by, the processor, to perform investigation recommendation operations which comprise:

receiving a task for a risk investigation of a fraud alert for an entity, wherein the task is associated with a first investigation stage of the plurality of investigation stages;

determining, for processing the task in a queue of pending investigations for the entity, a prioritization of the fraud alert using a continuous learning system of the IDAF that includes at least one machine learning (ML) model trained for automating the investigation tasks;

based on processing the pending investigations in the queue, allocating, by the continuous learning system, the task for the fraud alert to an investigator from a pool of investigators for the pending investigations based on investigator factors for each investigator in the pool of investigators;

determining, using the continuous learning system, investigation data required by the investigator for the task when performing an evaluation of the fraud alert during the first investigation phase with the IDAF;

collecting the investigation data from at least one data resource, wherein the at least one data resource comprises at least one of an investigative tool or an investigation database integrated with the ARI system from existing resources for the entity, and wherein the collecting from the at least one data resource is performed in compliance with required legal standards and regulations for a jurisdiction associated with at least one of the fraud alert or the entity;

orchestrating the investigation data for the task with at least one additional task for the evaluation of the fraud alert with the IDAF in compliance with a data security requirement for at least one of the entity or the jurisdiction; and outputting the investigation data with the evaluation for the risk investigation for the entity in compliance with the data security requirement and the required legal standards and regulations for the jurisdiction.

2. The ARI system of claim 1, wherein the investigation recommendation operations further comprise:

aggregating evidence from the investigation data for the task and additional investigation data for the at least one additional task; and generating a structured report for the fraud alert based on the evidence for each of the plurality of investigation stages.

3. The ARI system of claim 1, wherein the investigation data required by the investigator is based on a plurality of steps for a completion of the first investigation stage, and wherein the investigation recommendation operations further comprise:

receiving feedback from the investigator on the investigation data collected, wherein the feedback comprises first feedback associated with a usefulness of the investigation data collected and second feedback associated with a user experience with a usage of the ARI system by the investigator; and refining the at least one ML model of the continuous learning system based on the first feedback; and refining at least one of a system usability component or a user interface based on the second feedback.

4. The ARI system of claim 1, wherein the orchestrating comprises:

monitoring and evaluating results of each of the plurality of investigation stages based on the orchestrating the investigation data; and predicting, using the continuous learning system, a further requirement of a subsequent one of the plurality of investigation stages based on the results.

5. The ARI system of claim 1, wherein the investigation recommendation operations further comprise:

identifying that a portion of the investigation data requires a specialized analysis by another investigator in the pool of investigators; and routing the portion of the investigation data to the other investigator via a request for assistance with the task.

6. The ARI system of claim 1, wherein the at least one ML model utilizes a weighted evaluation function for the determining the prioritization, and wherein the weighted evaluation function assess the prioritization using a plurality of weighted values including at least one of a risk score of the fraud alert, a date when the fraud alert occurred, or a quantified measure of a historical context associated with the fraud alert.

7. The ARI system of claim 6, wherein a weight for each of the plurality of weighted values is dynamically adjusted over time based on a feedback loop and one or more performance metrics.

8. The ARI system of claim 1, wherein the investigation tasks automated by the ARI system include at least one of an automated content condensation, an automated data retrieval, a dynamic content creation from at least one of the investigation data, a rules-to-text processor, an assessment of text summarization precision, an assessment of text summarization quality, a transaction to narrative conversion, a tabular data summarization, or an extraction of a text conclusion.

9. The ARI system of claim 1, wherein ARI system is adaptable to different organizational sizes and types of fraud to scale the ARI system based on a dataset size and a number of cases associated with the different organizational sizes and the types of fraud, and wherein the ARI system is customized based on one of the different organizational sizes and one of the types of fraud for the fraud alert and the entity.

10. A method, executed by a hardware processor, to automate investigation tasks during a plurality of investigation stages using an intelligent decision automation framework (IDAF) for autonomous risk investigation (ARI) system, the method comprising:

receiving a task for a risk investigation of a fraud alert for an entity, wherein the task is associated with a first investigation stage of the plurality of investigation stages;

determining, for processing the task in a queue of pending investigations for the entity, a prioritization of the fraud alert using a continuous learning system of the IDAF that includes at least one machine learning (ML) model trained for automating the investigation tasks;

based on processing the pending investigations in the queue, allocating, by the continuous learning system, the task for the fraud alert to an investigator from a pool of investigators for the pending investigations based on investigator factors for each investigator in the pool of investigators;

determining, using the continuous learning system, investigation data required by the investigator for the task when performing an evaluation of the fraud alert during the first investigation phase with the IDAF;

collecting the investigation data from at least one data resource, wherein the at least one data resource comprises at least one of an investigative tool or an investigation database integrated with the ARI system from existing resources for the entity, and wherein the collecting from the at least one data resource is performed in compliance with required legal standards and regulations for a jurisdiction associated with at least one of the fraud alert or the entity;

orchestrating the investigation data for the task with at least one additional task for the evaluation of the fraud alert with the IDAF in compliance with a data security requirement for at least one of the entity or the jurisdiction; and outputting the investigation data with the evaluation for the risk investigation for the entity in compliance with the data security requirement and the required legal standards and regulations for the jurisdiction.

11. The method of claim 10, further comprising:

aggregating evidence from the investigation data for the task and additional investigation data for the at least one additional task; and generating a structured report for the fraud alert based on the evidence for each of the plurality of investigation stages.

12. The method of claim 10, wherein the investigation data required by the investigator is based on a plurality of steps for a completion of the first investigation stage, and wherein the method further comprises:

receiving feedback from the investigator on the investigation data collected, wherein the feedback comprises first feedback associated with a usefulness of the investigation data collected and second feedback associated with a user experience with a usage of the ARI system by the investigator; and refining the at least one ML model of the continuous learning system based on the first feedback; and refining at least one of a system usability component or a user interface based on the second feedback.

13. The method of claim 10, wherein the orchestrating comprises:

monitoring and evaluating results of each of the plurality of investigation stages based on the orchestrating the investigation data; and predicting, using the continuous learning system, a further requirement of a subsequent one of the plurality of investigation stages based on the results.

14. The method of claim 10, further comprising:

identifying that a portion of the investigation data requires a specialized analysis by another investigator in the pool of investigators; and routing the portion of the investigation data to the other investigator via a request for assistance with the task.

15. The method of claim 10, wherein the at least one ML model utilizes a weighted evaluation function for the determining the prioritization, and wherein the weighted evaluation function assess the prioritization using a plurality of weighted values including at least one of a risk score of the fraud alert, a date when the fraud alert occurred, or a quantified measure of a historical context associated with the fraud alert.

16. The method of claim 15, wherein a weight for each of the plurality of weighted values is dynamically adjusted over time based on a feedback loop and one or more performance metrics.

17. The method of claim 10, wherein the investigation tasks automated by the ARI system include at least one of an automated content condensation, an automated data retrieval, a dynamic content creation from at least one of the investigation data, a rules-to-text processor, an assessment of text summarization precision, an assessment of text summarization quality, a transaction to narrative conversion, a tabular data summarization, or an extraction of a text conclusion.

18. The method of claim 10, wherein ARI system is adaptable to different organizational sizes and types of fraud to scale the ARI system based on a dataset size and a number of cases associated with the different organizational sizes and the types of fraud, and wherein the ARI system is customized based on one of the different organizational sizes and one of the types of fraud for the fraud alert and the entity.

19. A non-transitory computer-readable medium having stored thereon computer-readable instructions executable to automate investigation tasks during a plurality of investigation stages using an intelligent decision automation framework (IDAF) for autonomous risk investigation (ARI) system, the computer-readable instructions executable to perform investigation recommendation operations which comprise:

receiving a task for a risk investigation of a fraud alert for an entity, wherein the task is associated with a first investigation stage of the plurality of investigation stages;

determining, for processing the task in a queue of pending investigations for the entity, a prioritization of the fraud alert using a continuous learning system of the IDAF that includes at least one machine learning (ML) model trained for automating the investigation tasks;

based on processing the pending investigations in the queue, allocating, by the continuous learning system, the task for the fraud alert to an investigator from a pool of investigators for the pending investigations based on investigator factors for each investigator in the pool of investigators;

determining, using the continuous learning system, investigation data required by the investigator for the task when performing an evaluation of the fraud alert during the first investigation phase with the IDAF;

collecting the investigation data from at least one data resource, wherein the at least one data resource comprises at least one of an investigative tool or an investigation database integrated with the ARI system from existing resources for the entity, and wherein the collecting from the at least one data resource is performed in compliance with required legal standards and regulations for a jurisdiction associated with at least one of the fraud alert or the entity;

orchestrating the investigation data for the task with at least one additional task for the evaluation of the fraud alert with the IDAF in compliance with a data security requirement for at least one of the entity or the jurisdiction; and outputting the investigation data with the evaluation for the risk investigation for the entity in compliance with the data security requirement and the required legal standards and regulations for the jurisdiction.

20. The non-transitory computer-readable medium of claim 17, wherein the investigation recommendation operations further comprise:

aggregating evidence from the investigation data for the task and additional investigation data for the at least one additional task; and generating a structured report for the fraud alert based on the evidence for each of the plurality of investigation stages.

* * * * *